(12) United States Patent
Jeong

(10) Patent No.: US 7,548,380 B2
(45) Date of Patent: Jun. 16, 2009

(54) ZOOM LENS

(75) Inventor: Jin Moung Jeong, Seongnam-si (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 11/944,033

(22) Filed: Nov. 21, 2007

(65) Prior Publication Data

US 2008/0117529 A1 May 22, 2008

(30) Foreign Application Priority Data

Nov. 22, 2006 (KR) ............ 10-2006-0115640

(51) Int. Cl.
*G02B 15/14* (2006.01)
(52) U.S. Cl. ............ 359/691; 359/680; 359/694
(58) Field of Classification Search ............ 359/691, 359/680, 694, 690
See application file for complete search history.

(56) References Cited

U.S. PATENT DOCUMENTS

| | | | | |
|---|---|---|---|---|
| 6,259,508 B1 * | 7/2001 | Shigematsu | ............ | 355/53 |
| 7,283,314 B2 * | 10/2007 | Nanba | ............ | 359/784 |
| 7,295,381 B2 * | 11/2007 | Ito | ............ | 359/689 |
| 7,446,956 B2 * | 11/2008 | Shimada | ............ | 359/784 |
| 2001/0036020 A1 * | 11/2001 | Yamamoto | ............ | 359/676 |

* cited by examiner

*Primary Examiner*—Timothy J Thompson
(74) *Attorney, Agent, or Firm*—Saliwanchik, Lloyd & Saliwanchik

(57) ABSTRACT

A zoom lens is disclosed. The zoom lens comprises a first lens group located adjacent to an object side and having a negative refractive power, and a second lens group located adjacent to an image side and having a positive refractive power, wherein zooming is made as an interval between the first lens group and the second lens group is varied.

17 Claims, 14 Drawing Sheets

ZOOM LENS

CROSS-REFERENCE TO RELATED APPLICATION

The present application claims the benefit under 35 U.S.C. §119 of Korean Patent Application No. 10-2006-0115640, filed Nov. 22, 2006, which is hereby incorporated by reference in its entirety.

BACKGROUND

Recently, compact digital cameras and digital video cameras provided with a solid imaging device such as a CCD or a CMOS imaging device are being embedded in cell phones and mobile communication terminals. Since such an imaging device has been manufactured in a micro size, miniaturization of a zoom lens installed in the imaging device has also been required.

BRIEF SUMMARY

A zoom lens according to embodiments of the present invention can be manufactured in a micro size.

Further embodiments of the present invention provide a zoom lens having superior aberration characteristics and improved productivity.

In one embodiment of the present invention, there is provided a zoom lens comprising: a first lens group located adjacent to an object side and having a total negative refractive power; and a second lens group located adjacent to an image side and having a total positive refractive power, wherein zooming occurs as an interval between the first lens group and the second lens group is varied. According to this embodiment, the zoom lens satisfies $$-4 < \frac{f1}{Zr} < -0.5,$$

where f1 denotes a focal distance of the first lens group, and Zr denotes a ratio of a focal distance at a telephoto position (tele) to a focal distance at a wide angle position (wide).

In another embodiment, there is provided a zoom lens comprising: a first lens group located adjacent to an object side and having a total negative refractive power; and a second lens group located adjacent to an image side and having a total positive refractive power, wherein zooming occurs as an interval between the first lens group and the second lens group is varied. According to this embodiment, the zoom lens satisfies $$-1 < \frac{f1}{ttlw} < -0.15,$$

where f1 denotes the focal distance of the first lens group, and ttlw denotes total length of the wide.

DETAILED DESCRIPTION

Hereinafter, embodiments of the present invention will be described with reference to accompany drawings.

Figure 1:
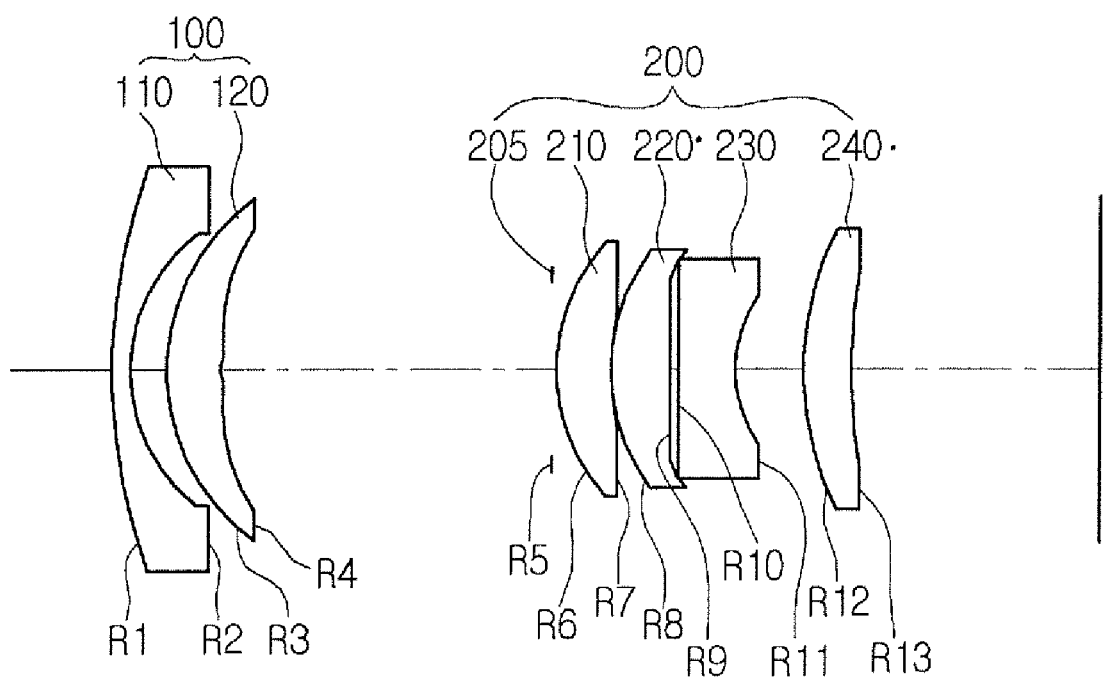
FIG. 1 is a side sectional view schematically showing a zoom lens according to an embodiment of the present invention.

Referring to FIG. 1, a zoom lens according to an embodiment of the present invention comprises a first lens group 100 and a second lens group 200.

The first lens group 100 is located adjacent to an object side and has a total negative refractive power. The first lens group 100 comprises a negative lens having a convex surface facing an object side. As used herein, the object side is defined as the side to which an object to be imaged is located, and the image side is defined as the side to which an imaging device is located.

According to embodiments of the present invention, the first lens group 100 comprises, sequentially from object side to image side: a first lens 110 and a second lens 120.

The first lens 110 has a convex surface facing the object side and a negative refractive power. The second lens 120 has a convex surface facing the object side and positive refractive power. As a whole, the first lens group 100 has negative refractive power.

The second lens group 200 is located adjacent to the image side and has a total positive refractive power. The second lens group 200 comprises a positive lens having a convex surface facing the object side. According to an embodiment of the present invention, at least one surface of the positive lens is an aspheric surface.

According to certain embodiments of the present invention, the second lens group 200 comprises, sequentially from object side to image side: an iris 205, a third lens 210, a fourth lens 220, a fifth lens 230 and a sixth lens 240.

According to an embodiment of the present invention, the third lens 210 and the fourth lens 220 have convex surfaces facing the object side and positive refractive power. The fifth lens 230 has a concave surface facing the image side and negative refractive power. The sixth lens 240 has a convex surface facing the object side and positive refractive power. As a whole, the second lens group 200 has positive refractive power.

Figure 2:
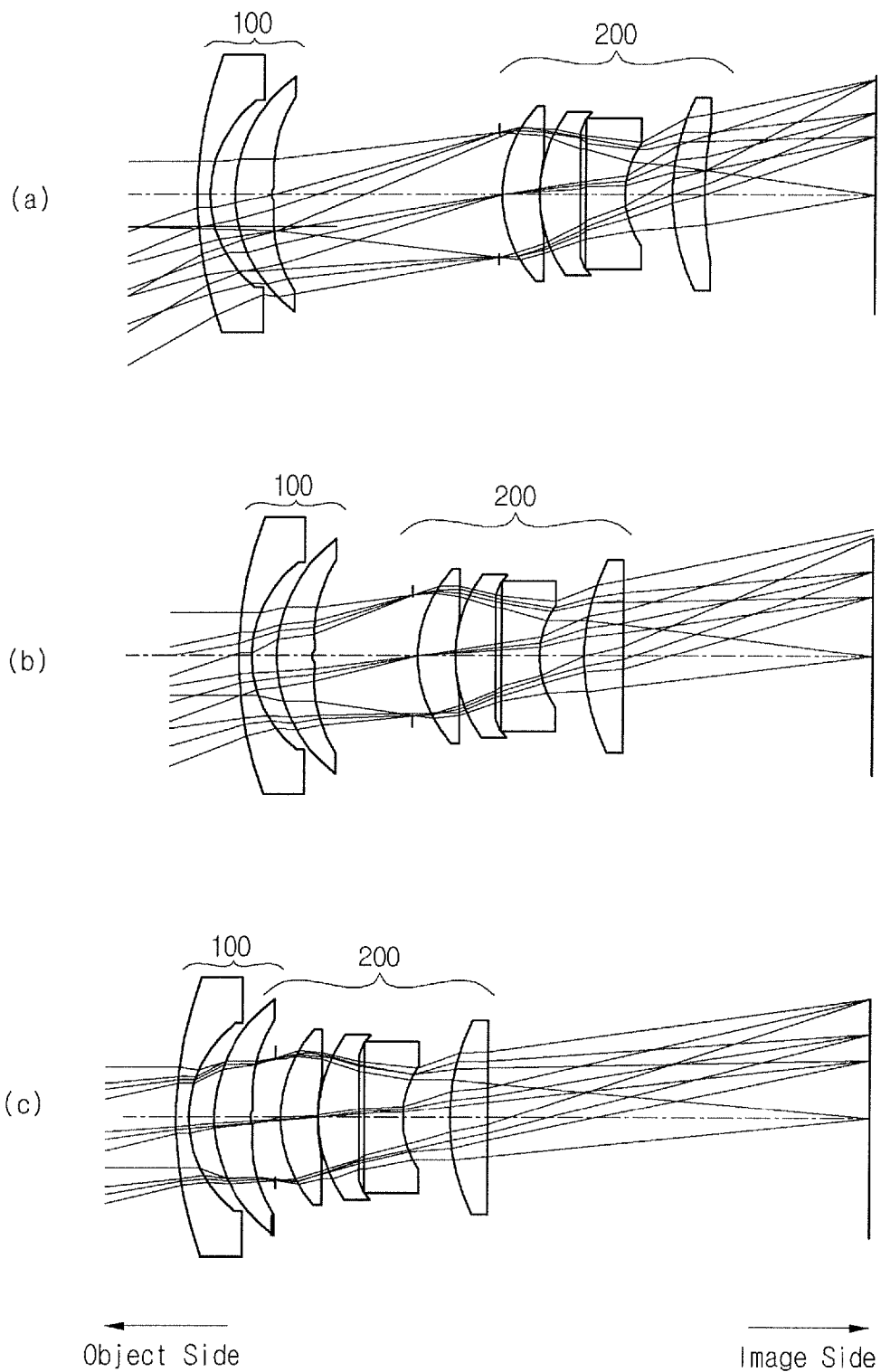
FIG. 2 is a view showing a zoom operation of the zoom lens according to an embodiment of the present invention.
Figure 3:
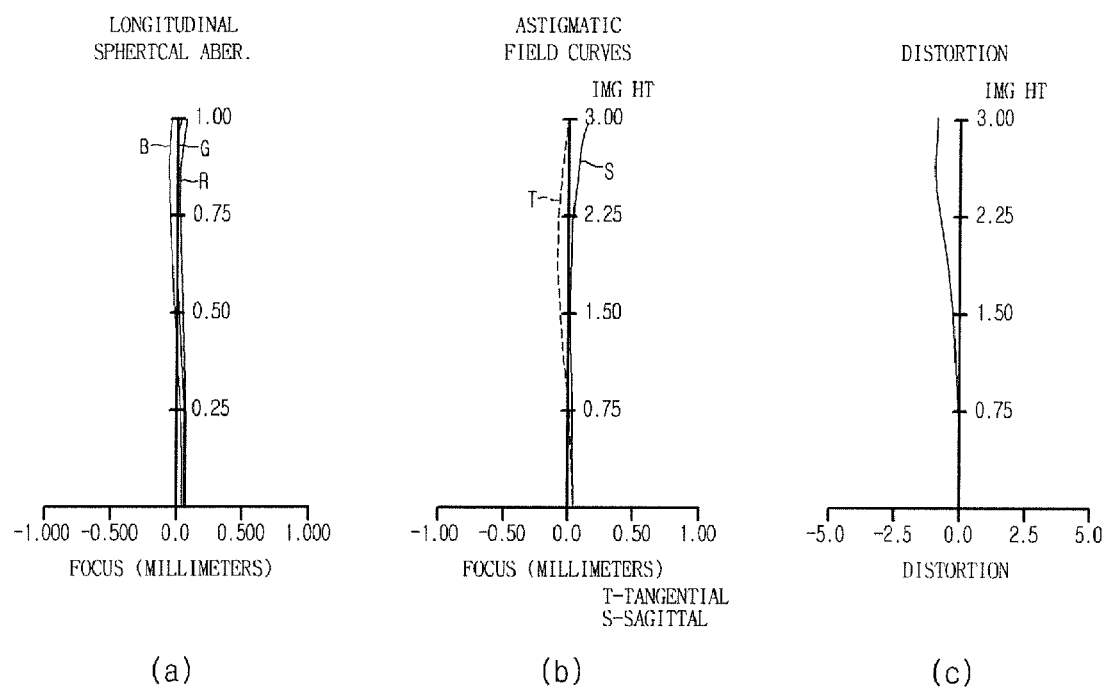
FIGS. 3 and 4 show aberration graphs at a wide angle position (wide) according to a first embodiment of the present invention.
Figure 4:
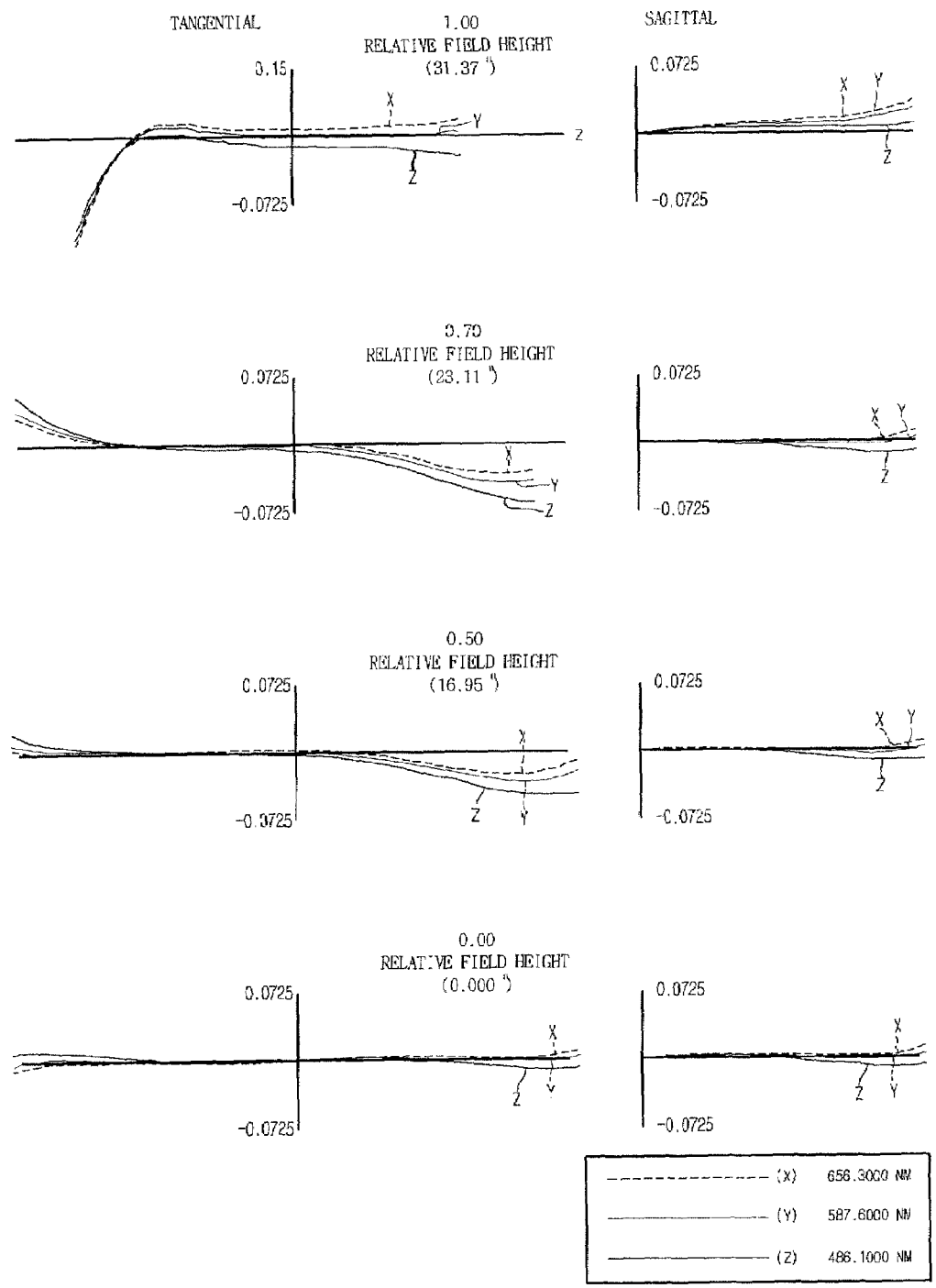
Figure 5:
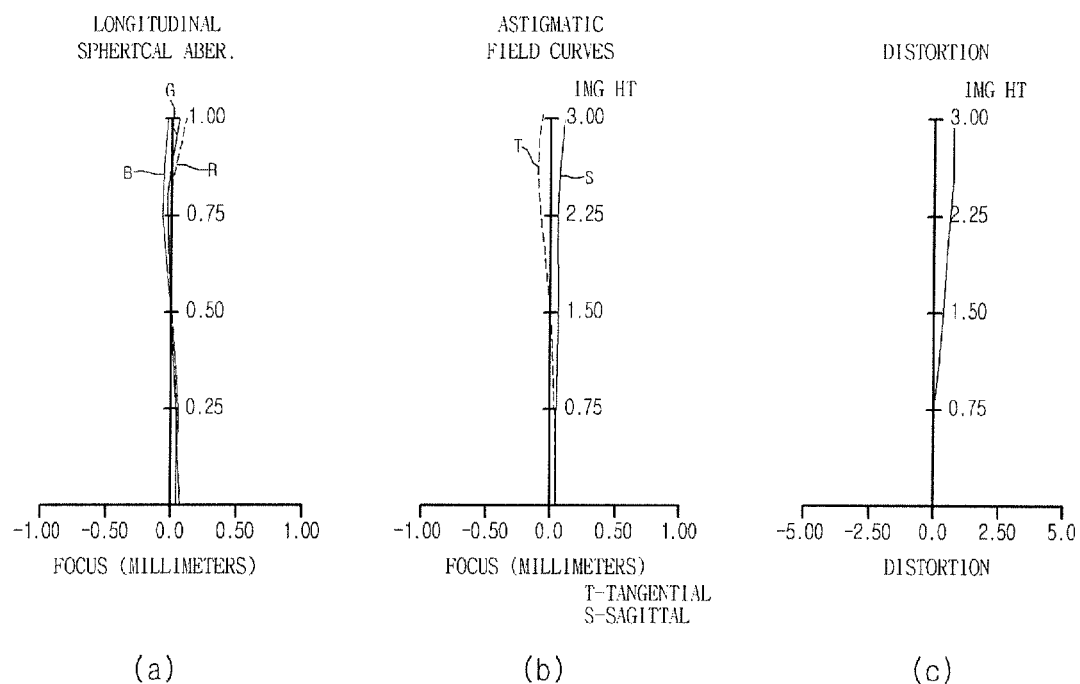
FIGS. 5 and 6 show aberration graphs at the normal position according to a first embodiment of the present invention.
Figure 6:
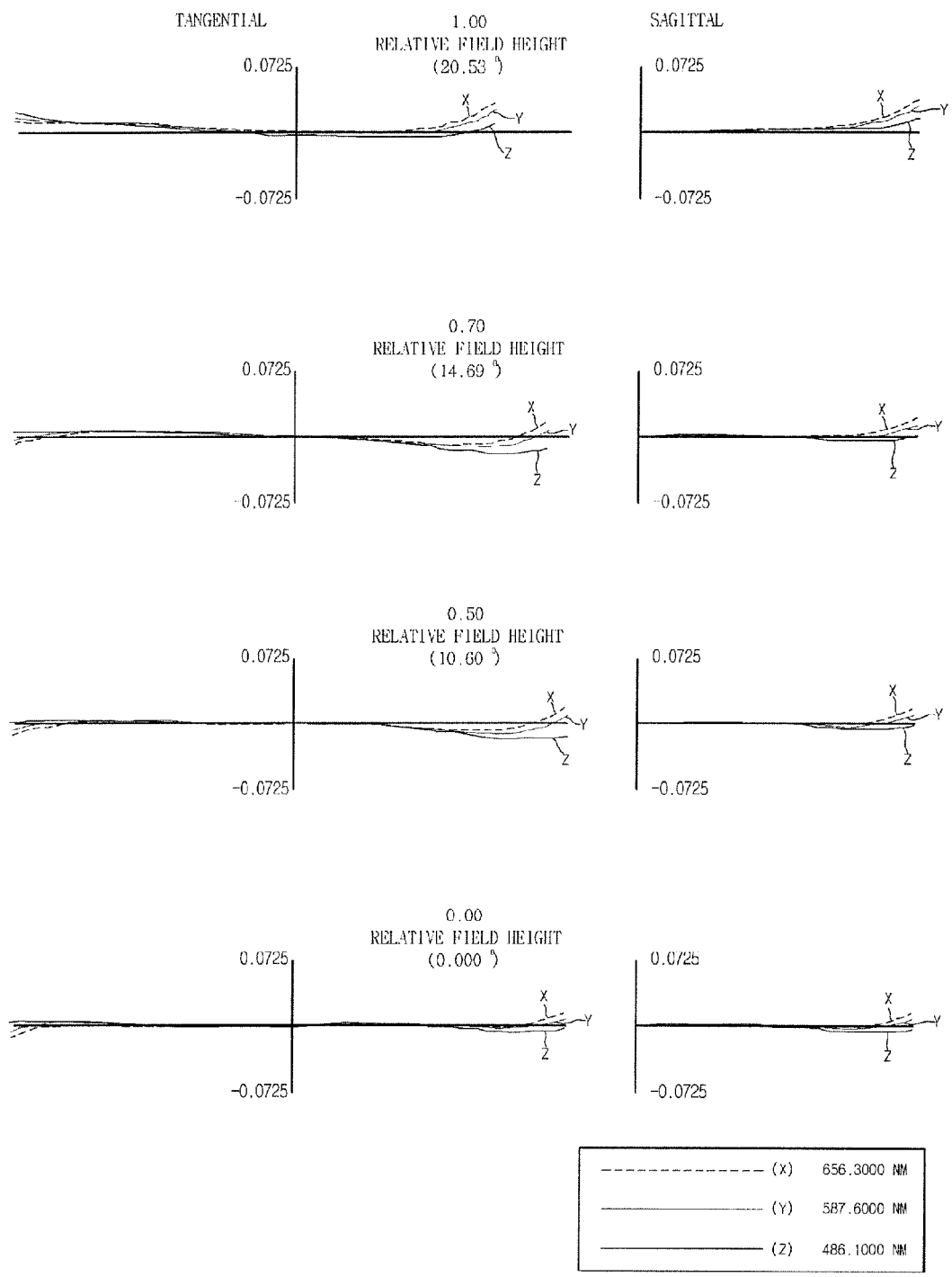
Figure 7:
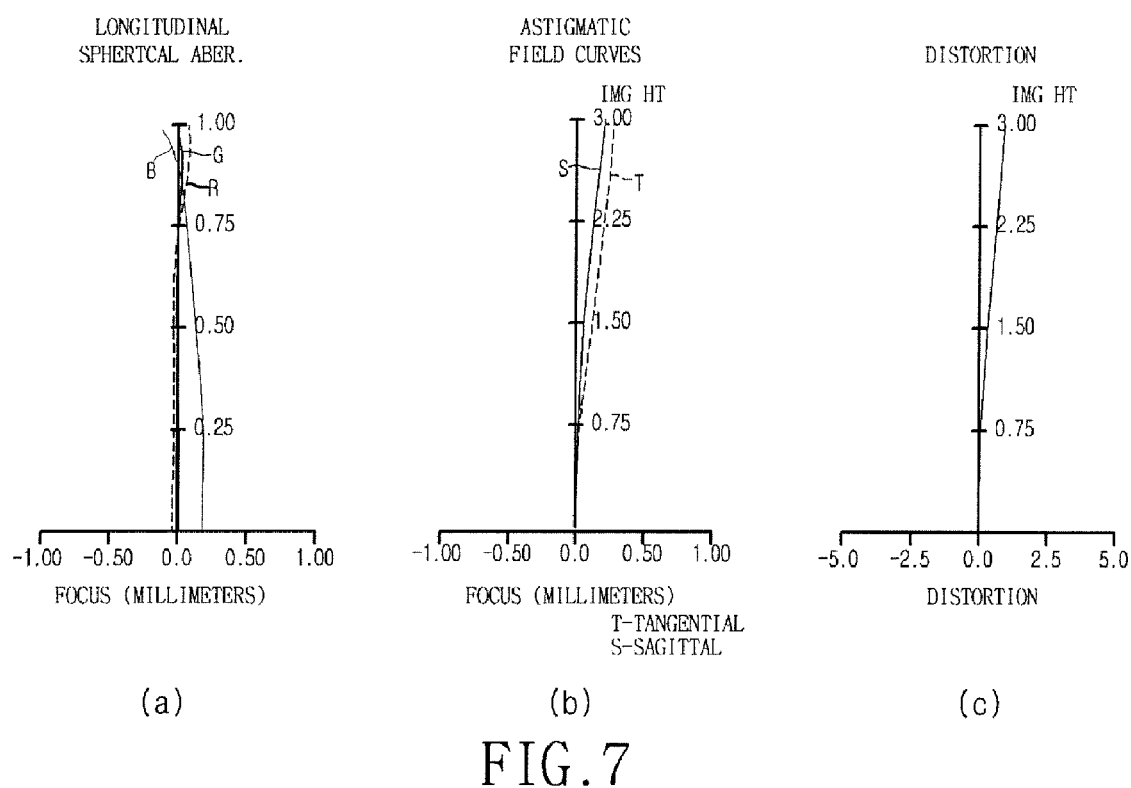
FIGS. 7 and 8 show aberration graphs at a telephoto position (tele) according to a first embodiment of the present invention.
Figure 8:
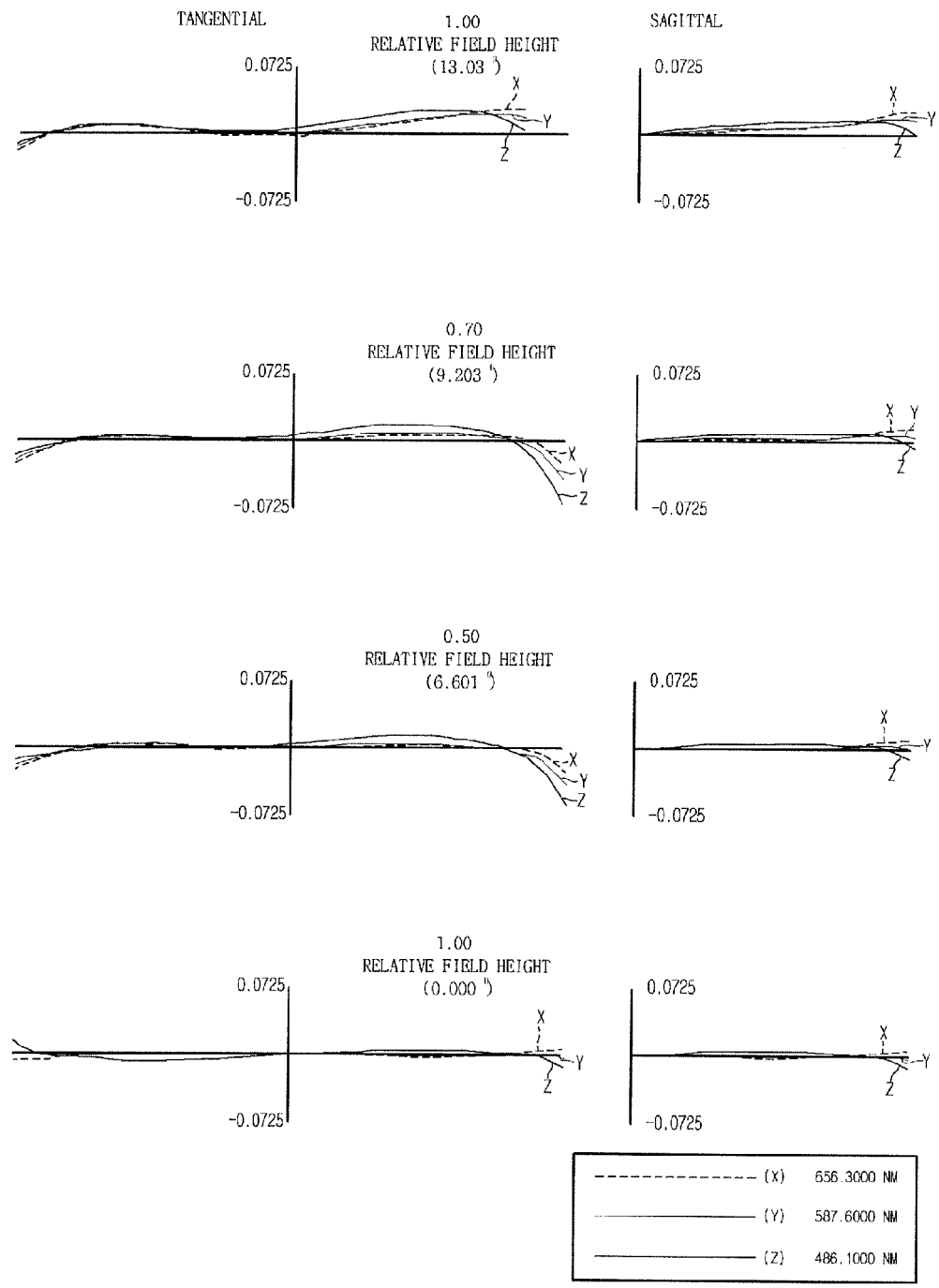
Figure 9:
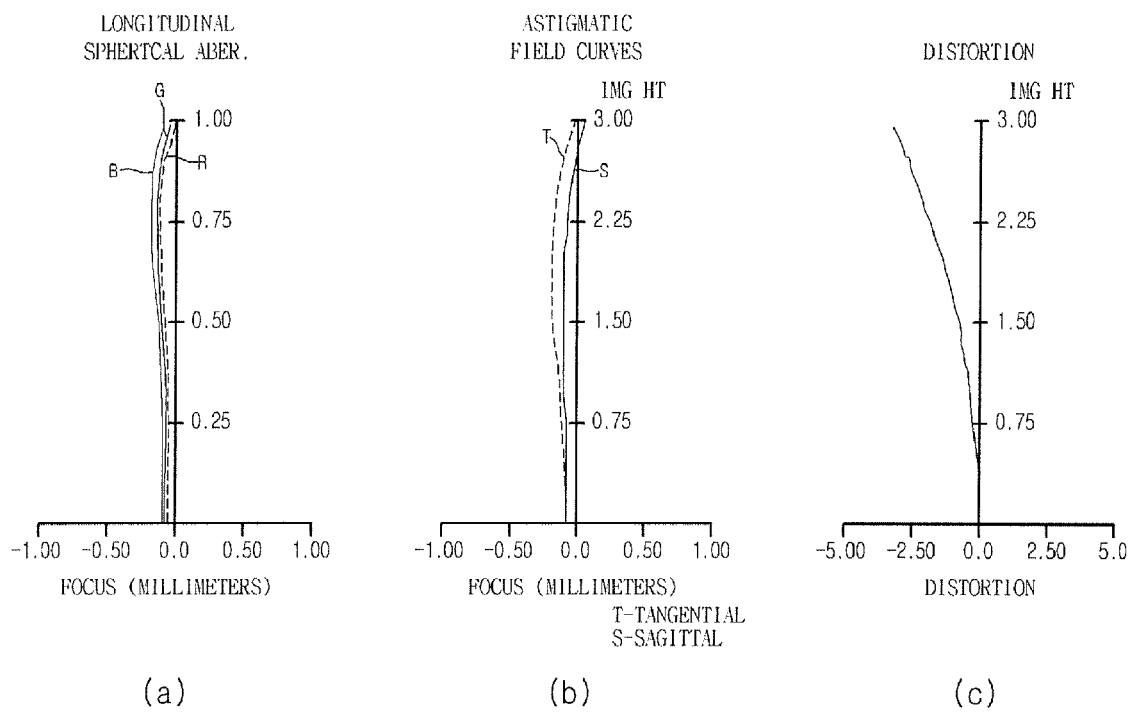
FIGS. 9 and 10 show aberration graphs at the wide according to a second embodiment of the present invention.
Figure 10:
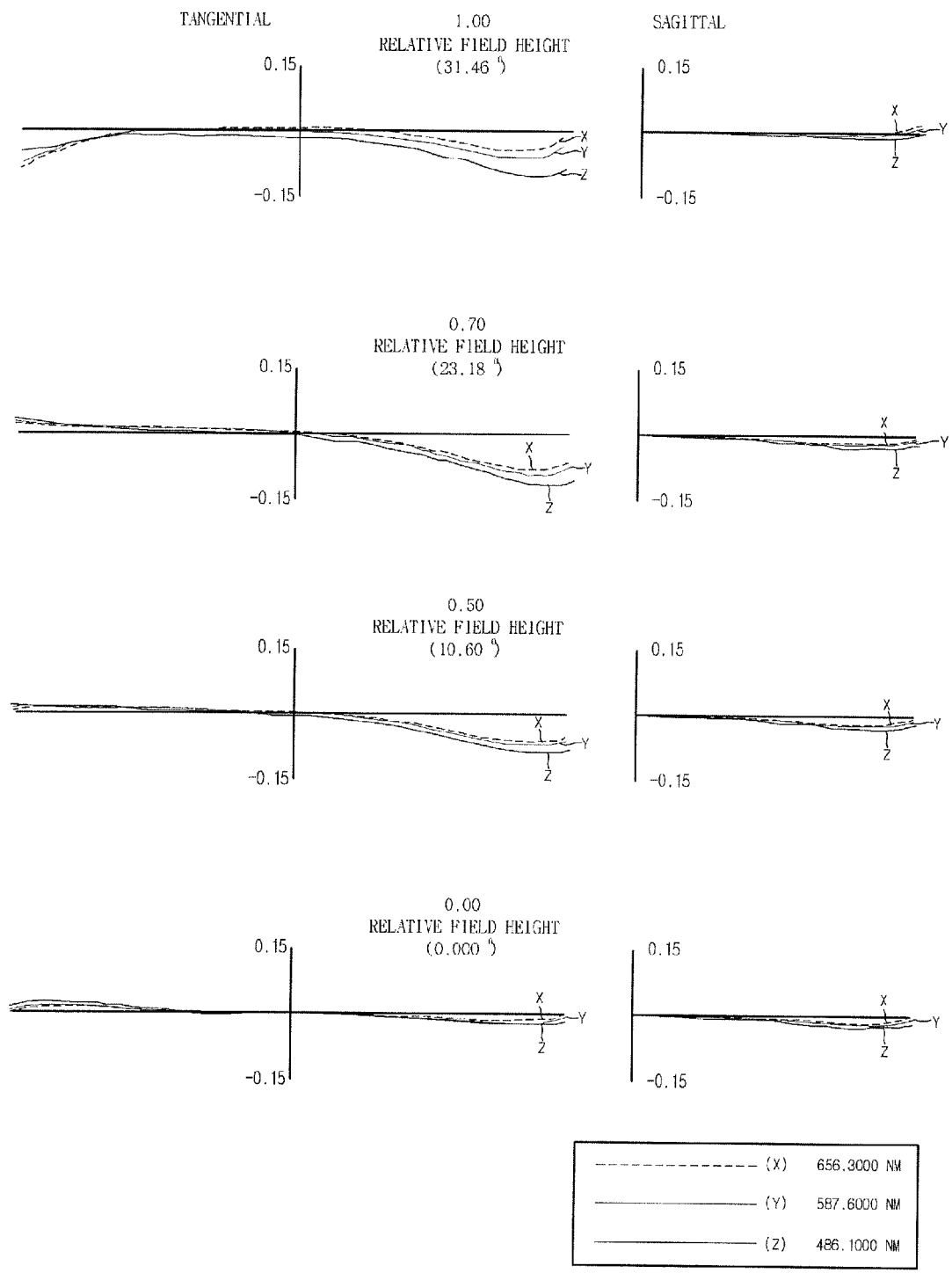
Figure 11:
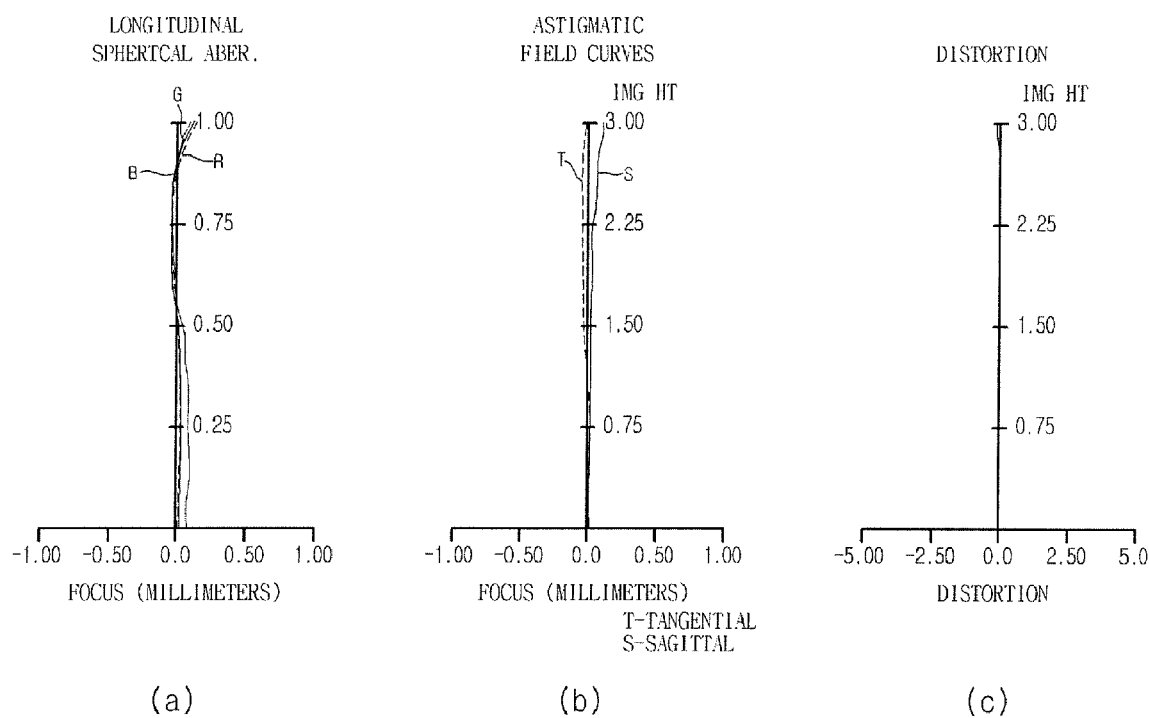
FIGS. 11 and 12 show aberration graphs at the normal position according to a second embodiment of the present invention.
Figure 12:
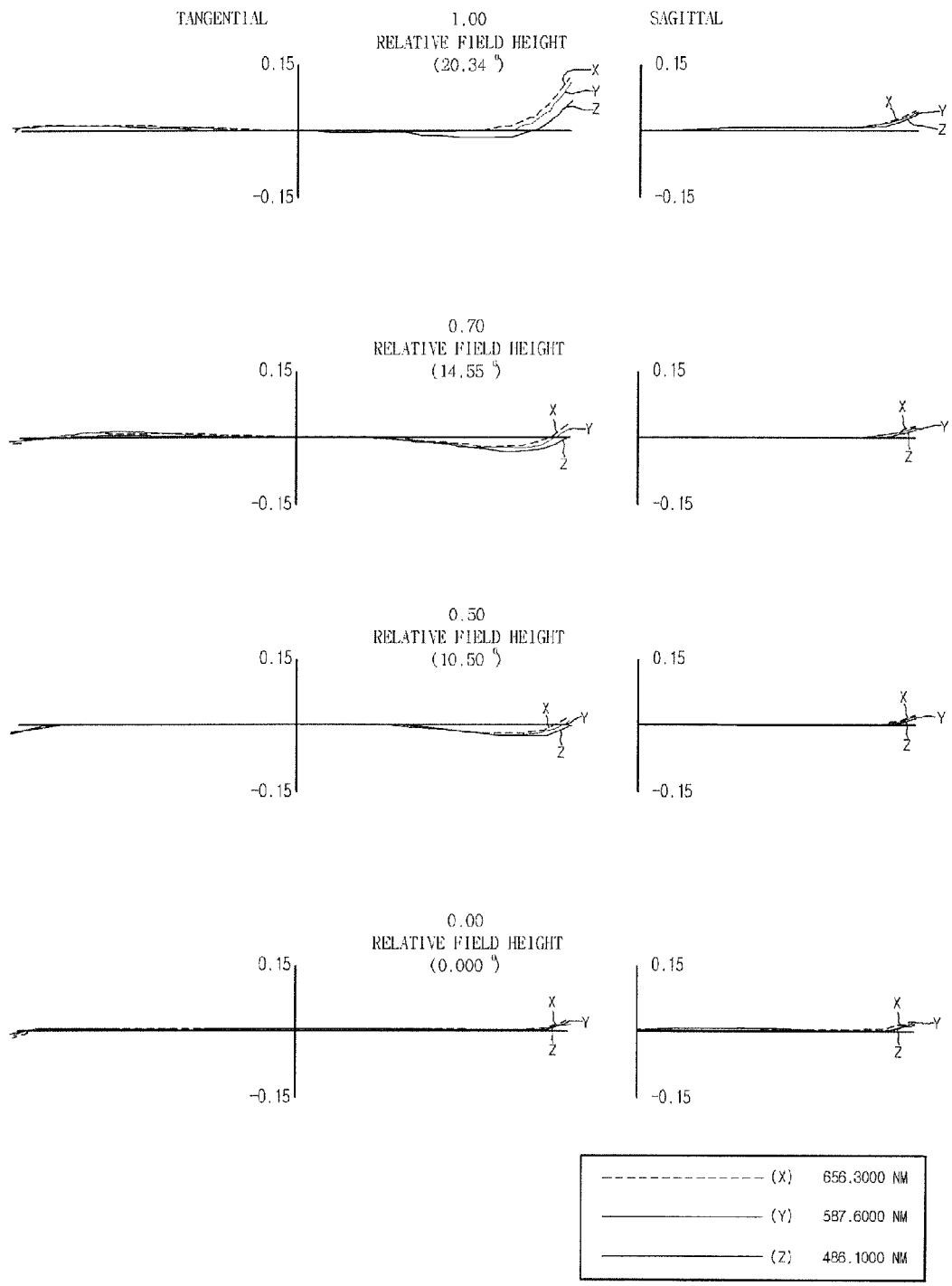
Figure 13:
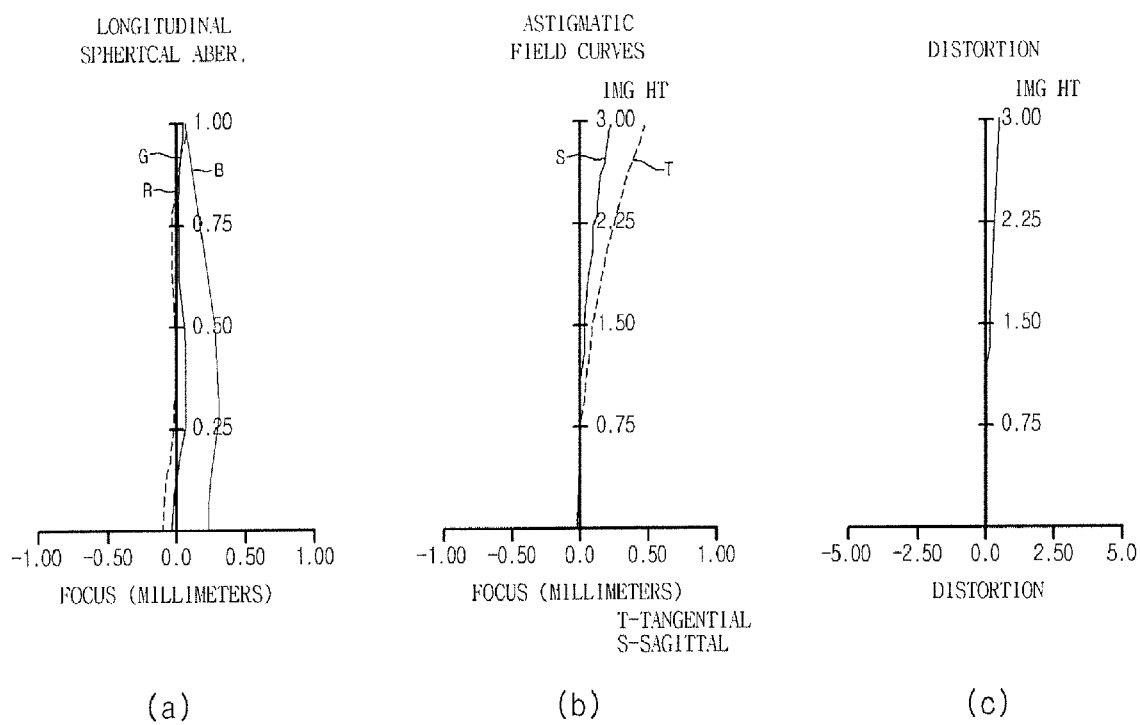
FIGS. 13 and 14 show aberration graphs at the tele according to a second embodiment of the present invention.
Figure 14:
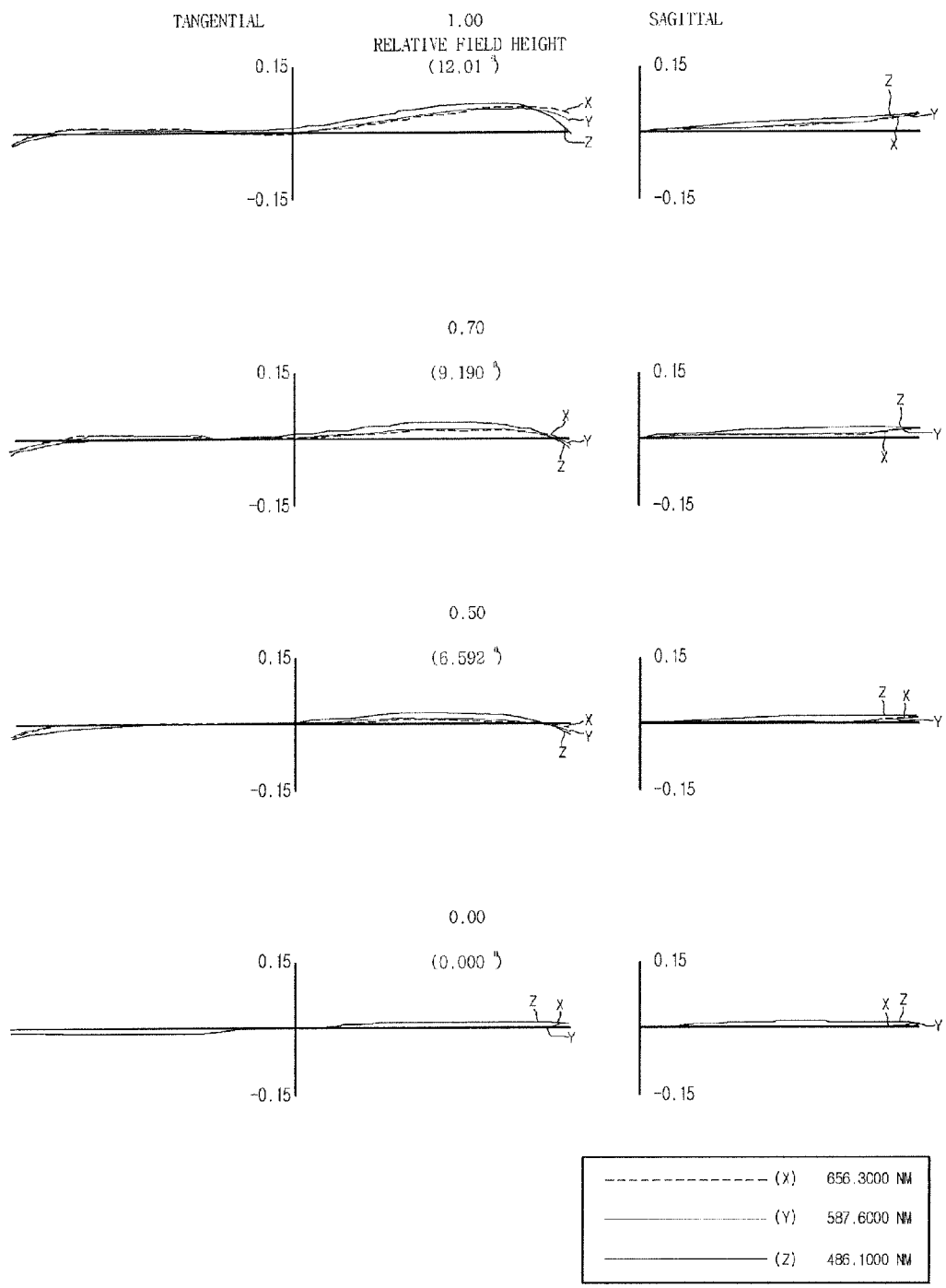

FIG. 2 shows a zoom operation of the zoom lens according to the present invention.

FIG. 2A is a view showing the zoom lens at a wide angle position (wide), FIG. 2B is a view showing the zoom lens at a normal position, and FIG. 2C is a view showing the zoom lens at a telephoto position (tele).

According to the present invention, as an interval between the first lens group 100 and the second lens group 200 is varied, zooming can be conducted.

A first embodiment of the present invention can have zoom parameter values as shown in Table 1 below.

TABLE 1

| Zoom parameter | Wide | Normal | Tele |
|---|---|---|---|
| A | 5.6979 | 2.5274 | 0.6000 |
| B | 2.9713 | 5.0005 | 8.2743 |
| Focal distance | 4.9222 | 8.0152 | 12.9703 |
| F-number | 3.0845 | 3.9495 | 5.3461 |

In Table 1, 'A' denotes the distance between the second lens 120 and the third lens 210, and 'B' denotes the distance between the sixth lens 240 and the image side.

Table 2 shows numerical information of elements of a zoom lens as illustrated in FIG. 1 according to the first embodiment.

TABLE 2

| Lens surface | Curvature radius (mm) | Thickness (mm) | Refractive index (n) | Abbe's number (v) |
|---|---|---|---|---|
| object | Infinity | Infinity | | |
| R1 | 11.57847 | 0.300000 | 1.793314 | 44.4664 |
| R2 | 2.77101 | 0.700000 | | |
| R3 | 4.50126 | 0.917985 | 1.806105 | 40.7344 |
| R4 | 7.91348 | A | | Aspheric surface |
| R5 | Infinity | 0.114229 | | iris |
| R6 | 3.12173 | 0.909822 | 1.750251 | 50.5310 |
| R7 | 35.59227 | 0.551259 | | |
| R8 | 4.25865 | 0.924270 | 1.589129 | 61.2526 |
| R9 | −190.61199 | 0.160041 | | Aspheric surface |
| R10 | −19.37602 | 1.000000 | 1.847000 | 23.8000 |
| R11 | 2.49259 | 1.498437 | | |
| R12 | 6.10364 | 0.826050 | 1.585000 | 30.0000 |
| R13 | 60.79809 | B | | Aspheric surface |
| Image side | Infinity | | | |

In Table 2, the curvature radius denotes the curvature radius of an optical surface, and the thickness denotes the thickness of the optical surface.

As illustrated in FIG. 1, the lens surfaces have character references (R1-R13) sequentially assigned in the direction from the object side to the image side.

The zoom lens according to the first embodiment comprises second lens 120 having an aspheric surface R4, fourth lens 220 having an aspheric surface R9, and sixth lens 240 having an aspheric surface R13.

In the first embodiment, the aspheric surface of a lens is expressed by Equation 1 below.

$$z = \frac{cY^2}{1 + \sqrt{1-(1+K)c^2Y^2}} + AY^4 + BY^6 + CY^8 + DY^{10} \quad \text{(Equation 1)}$$

In Equation 1, 'z' denotes the distance from the vertex of the optical surface obtained along the optical axis, 'Y' denotes the distance in the direction perpendicular to the optical axis, 'c' denotes curvature at the vertex of the optical surface, 'K' denotes a conic coefficient, and 'A', 'B', 'C' and 'D' denote aspheric surface coefficients.

Equation 1 is also used for expressing the aspheric surface of a lens for the second embodiment to be described later.

Table 3 shows numerical values of the aspheric surface coefficients for each aspheric surface according to the first embodiment.

TABLE 3

| | curvature | K | A | B | C | D |
|---|---|---|---|---|---|---|
| R4 | 0.12636663 | −3.083802 | $-1.90225 \times 10^{-3}$ | $-4.35182 \times 10^{-5}$ | $-1.90147 \times 10^{-5}$ | $-6.43750 \times 10^{-6}$ |
| R9 | −0.00524626 | −254633.1192 | $1.31178 \times 10^{-2}$ | $2.95006 \times 10^{-3}$ | $-2.82003 \times 10^{-4}$ | $3.25609 \times 10^{-4}$ |
| R13 | 0.01644788 | −23.108719 | $3.97106 \times 10^{-6}$ | $-2.55420 \times 10^{-4}$ | $3.53151 \times 10^{-5}$ | $0.00000E+00$ |

In Table 3, R4, R9 and R13 denote the character references of the lens surfaces as shown in FIG. 1.

FIGS. 3 to 8 show longitudinal spherical aberration, astigmatic aberration, distortion aberration, and coma aberration of a zoom lens at the wide, the normal, and the tele according to the first embodiment.

The second embodiment of the present invention can have zoom parameter values as shown in Table 4 below.

TABLE 4

| Zoom parameter | Wide | Normal | Tele |
|---|---|---|---|
| A | 5.5493 | 2.4224 | 0.6125 |
| B | 4.1111 | 6.1492 | 9.4606 |
| Focal distance | 4.9032 | 8.0930 | 12.9802 |
| F-number | 3.0067 | 3.8503 | 5.1482 |

In Table 4, 'A' denotes the distance between the second lens 120 and the third lens 210, and 'B' denotes the distance between the sixth lens 240 and the image side.

Table 5 shows numerical data of elements of a zoom lens according to the second embodiment.

TABLE 5

| Lens surface | Curvature radius (mm) | Thickness (mm) | Refractive index (n) | Abbe's number (v) |
|---|---|---|---|---|
| Object | infinity | Infinity | | |
| R1 | 9.99736 | 0.300000 | 1.824864 | 38.6450 |
| R2 | 2.88784 | 0.655 | | |
| R3 | 3.87345 | 0.891898 | 1.806105 | 40.7344 |
| R4 | 5.40037 | A | | Aspheric surface |
| R5 | infinity | 0.100000 | | iris |
| R6 | 3.30305 | 0.974278 | 1.819284 | 39.5314 |
| R7 | 33.73120 | 0.053491 | | |
| R8 | 4.17984 | 0.914711 | 1.589129 | 61.2526 |
| R9 | −107.26170 | 0.100000 | | Aspheric surface |
| R10 | −36.41538 | 1.000000 | 1.847000 | 23.8000 |
| R11 | 2.18718 | 1.175061 | | |
| R12 | 5.89869 | 0.810269 | 1.732041 | 51.0566 |
| R15 | 110.27889 | B | | |

In Table 6, the curvature radius denotes the curvature radius of an optical surface, and the thickness denotes the thickness of the optical surface.

Similar to as shown in FIG. 1, the lens surfaces of the zoom lens according to the second embodiment have character references (R1-R13) sequentially assigned in the direction from the object side to the image side.

The zoom lens according to the second embodiment comprises third lens 210 having an aspheric surface R4 and fifth lens 230 having aspheric surface R9.

Table 6 shows numerical values of the aspheric surface coefficients for each aspheric surface.

TABLE 6

| | Curvature | K | A | B | C | D |
|---|---|---|---|---|---|---|
| R4 | 0.18517258 | −1.189240 | −1.00045 × 10⁻³ | 2.28423 × 10⁻⁵ | −3.75177 × 10⁻⁵ | 0.00000E+00 |
| R9 | −0.00932299 | −78254.66469 | 6.03307 × 10⁻³ | 1.89866 × 10⁻³ | −2.16083 × 10⁻⁴ | 7.11715 × 10⁻⁵ |

In Table 6, R4 and R9 denote the reference character of the lens surfaces as shown in FIG. 1.

FIGS. 9 to 14 show longitudinal spherical aberration, astigmatic aberration, distortion aberration, and coma aberration of a zoom lens at the wide, the normal, and the tele according to the second embodiment.

For FIGS. 3-14, the longitudinal spherical aberration indicates aberration characteristics based on RGB (Red, Green and Blue), the astigmatic aberration indicates aberration characteristics according to tangential and sagittal characteristics, and the coma aberration indicates aberration characteristics at the tangential and sagittal according to wavelength (X, Y, Z).

Table 7 shows condition equations for the first and second embodiments.

TABLE 7

| Condition equation | First embodiment | Second embodiment |
|---|---|---|
| f1/Zr | −2.98 | −1.98 |
| f2/Zr | 1.95 | 2.10 |
| f1/ft | −0.61 | −0.40 |
| f2/ft | 0.40 | 0.42 |
| f1/fw | −1.60 | −1.03 |
| f2/fw | 1.04 | 1.10 |
| fw/ttlw | 0.30 | 0.30 |
| f1/ttlw | −0.48 | −0.30 |
| fw/ttlt | 0.29 | 0.29 |
| ft/ttlt | 0.78 | 0.76 |
| f1/ttlt | −0.47 | −0.30 |
| ft/ttlw | 0.79 | 0.77 |

In Table 7, Zr denotes the ratio of the total focal distance at the tele to the total focal distance at the wide (ft/fw), f1 denotes the focal distance of the first lens group, f2 denotes the focal distance of the second lens group, ft denotes the focal distance of the tele, fw denotes the focal distance of the wide, ttlw denotes the total length of the wide and ttlt denotes the total length of the tele.

A zoom lens according to the first and second embodiments can satisfy Equations 2 and 3 below.

$$-4 < \frac{f1}{Zr} < -0.5 \quad \text{(Equation 2)}$$

In Equation 2, f1 denotes the focal distance of the first lens group, and Zr denotes the ratio of the focal distance at the tele to the focal distance at the wide (ft/fw).

$$-1 < \frac{f1}{ttlw} < -0.15 \quad \text{(Equation 3)}$$

In Equation 3, f1 denotes the focal distance of the first lens group and ttlw denotes the total length of the wide.

In Equations 2 and 3, if Zr and ttlw exceed the maximum value, the power of the first lens group 100 is increased. Thus, performance of the zoom lens may deteriorate, e.g. coma may occur. Further, since sensitivity thereof is increased, there may occur a decrease in the productivity thereof.

In addition, if Zr and ttlw exceed the minimum value, the aberration performance of the zoom lens may be improved, but a problem relating to slimness thereof may occur.

Accordingly, the zoom lens according to embodiments of the present invention can be designed within the range of numerical values defined in Equations 2 and 3.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A zoom lens comprising:
   a first lens group located adjacent to a object side and having a total negative refractive power; and
   a second lens group located adjacent to a image side and having a total positive refractive power,
   wherein zooming occurs as a interval between the first lens group ad the second lens group is varied, wherein the zoom lens satisfies $$-4 < \frac{f1}{Zr} < -0.5,$$

where f1 denotes a focal distance of the first lens group, and Zr denotes a ratio of a focal distance at a telephoto position to a focal distance at a wide angle position (ft/fw), wherein the first lens group comprises, sequentially from the object side to the image side: a first lens and a second lens, wherein the second lens group comprises, from the object side to the image side: an iris, a third lens, a fourth lens, a fifth lens, and a sixth lens, wherein at least one surface of the fourth lens is an aspheric surface.

2. The zoom lens according to claim 1, wherein the first lens has a convex surface facing the object side ad negative refractive power, ad the second lens has a convex surface facing the object side ad positive refractive power.

3. The zoom lens according to claim 1, wherein at least one surface of the second lens is a aspheric surface.

4. The zoom lens according to claim 1, wherein the first lens group comprises a negative lens having a convex surface facing the object side.

5. The zoom lens according to claim 1, wherein the second lens group comprises a positive lens having a convex surface facing the object side, and wherein at least one positive lens of the second lens group has an aspheric surface.

6. The zoom lens according to claim 1, wherein the iris is located in front of the third lens at the object side.

7. The zoom lens according to claim 1, wherein the third lens, the fourth lens and the sixth lens have convex surfaces facing the object side and positive refractive power, and the fifth lens has a concave surface facing the image side and negative refractive power.

8. The zoom lens according to claim 1, wherein at least one surface of the sixth lens is an aspheric surface.

9. The zoom lens according to claim 1, wherein the zoom lens satisfies $$-1 < \frac{f1}{ttlw} < -0.15,$$

where f1 denotes the focal distance of the first lens group, and ttlw denotes total length of the wide angle position.

10. A zoom lens comprising:
a first lens group located adjacent to an object side and having a total negative refractive power; and
a second lens group located adjacent to an image side and having a total positive refractive power,
wherein zooming occurs as an interval between the first lens group and the second lens group is varied,
wherein the zoom lens satisfies $$-1 < \frac{f1}{ttlw} < -0.15,$$

where f1 denotes a focal distance of the first lens group, and ttlw denotes total length of a wide angle position, wherein the first lens group comprises, sequentially from the object side to the image side: a first lens and a second lens, wherein the second lens group comprises, from the object side to the image side: an iris, a third lens, a fourth lens, a fifth lens, and a sixth lens, wherein at least one surface of the fourth lens is an aspheric surface.

11. The zoom lens according to claim 10, wherein the first lens has a convex surface facing the object side and negative refractive power, and the second lens has a convex surface facing the object side and positive refractive power.

12. The zoom lens according to claim 10, wherein at least one surface of the second lens is an aspheric surface.

13. The zoom lens according to claim 10, wherein the first lens group comprises a negative lens having a convex surface facing the object side.

14. The zoom lens according to claim 10, wherein at least one positive lens of the second lens group has an aspheric surface.

15. The zoom lens according to claim 10, wherein the third lens, the fourth lens and the sixth lens have convex surfaces facing the object side and positive refractive power, and the fifth lens has a concave surface facing the image side and negative refractive power.

16. The zoom lens according to claim 10, wherein the iris is located in front of the third lens at the object side.

17. The zoom lens according to claim 10, wherein at least one surface of the sixth lens is an aspheric surface.

* * * * *